United States Patent
Lin et al.

(10) Patent No.: US 9,606,645 B2
(45) Date of Patent: Mar. 28, 2017

(54) DISPLAY APPARATUS AND PIXEL DRIVING METHOD WITH CURRENT COMPENSATION FUNCTION

(71) Applicant: AU Optronics Corporation, Hsin-Chu (TW)

(72) Inventors: Chun-Chieh Lin, Hsin-Chu (TW); Hua-Gang Chang, Hsin-Chu (TW); Chih-Cheng Chen, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 102 days.

(21) Appl. No.: 14/487,490

(22) Filed: Sep. 16, 2014

(65) Prior Publication Data

US 2015/0194094 A1 Jul. 9, 2015

(30) Foreign Application Priority Data

Jan. 8, 2014 (TW) .............................. 103100692 A (51) Int. Cl.
   *G09G 3/30* (2006.01)
   *G09G 3/36* (2006.01)
   *G06F 3/038* (2013.01)
   *G09G 3/32* (2016.01)

(52) U.S. Cl.
   CPC .......... *G06F 3/038* (2013.01); *G09G 3/3275* (2013.01); *G09G 3/3685* (2013.01); *G09G 2320/0214* (2013.01); *G09G 2320/0233* (2013.01)

(58) Field of Classification Search
   CPC .. G09G 3/3258; G09G 3/3233; G09G 3/3659; G06F 3/038
   See application file for complete search history.

(56) References Cited

U.S. PATENT DOCUMENTS

| | | | |
|---|---|---|---|
| 2002/0089382 A1* | 7/2002 | Yang | ...................... H03L 7/0895 331/17 |
| 2005/0190139 A1* | 9/2005 | Fujiyoshi | ............. G09G 3/3688 345/100 |
| 2005/0280617 A1 | 12/2005 | Sun et al. | |
| 2009/0309818 A1 | 12/2009 | Kim | |

(Continued)

FOREIGN PATENT DOCUMENTS

| | | |
|---|---|---|
| CN | 101615379 | 12/2009 |
| TW | 200601212 | 1/2006 |

*Primary Examiner* — Kwang-Su Yang
(74) *Attorney, Agent, or Firm* — WPAT, PC; Justin King; Jonathan Chiang (57) ABSTRACT

A display apparatus is provided. The display device includes pixels, a data line, a first current compensation unit, a second current compensation unit, and a control unit. The first current compensation unit is configured for providing a first current to pixels through the data line. The first current is configured for compensating a leakage current that flows out of the data line. The second current compensation unit is configured for sinking a second current from pixels through the data line. The second current is configured for compensating the leakage current that flows into the data line. The control unit is configured for controlling the first current compensation unit to provide the first current or controlling the second current compensation unit to sink the second current according to a voltage of the data line.

8 Claims, 8 Drawing Sheets

(56) References Cited

U.S. PATENT DOCUMENTS

2011/0205250 A1* 8/2011 Yoo ..................... G09G 3/3233
                                                        345/690
2012/0056867 A1   3/2012 Van Lier et al.
2012/0062615 A1   3/2012 Van Lier et al.
2013/0099692 A1   4/2013 Chaji et al.
2014/0347253 A1* 11/2014 Lee .................... H05B 33/0896
                                                        345/76

* cited by examiner

DISPLAY APPARATUS AND PIXEL DRIVING METHOD WITH CURRENT COMPENSATION FUNCTION

RELATED APPLICATIONS

This application claims priority to Taiwan Application Serial Number 103100692, filed Jan. 8, 2014, which is herein incorporated by reference.

BACKGROUND

Technical Field

The present disclosure relates to a display apparatus and a pixel driving method. More particularly, the present disclosure relates to a display apparatus and a pixel driving method with leakage current compensation.

Description of Related Art

Figure 1:
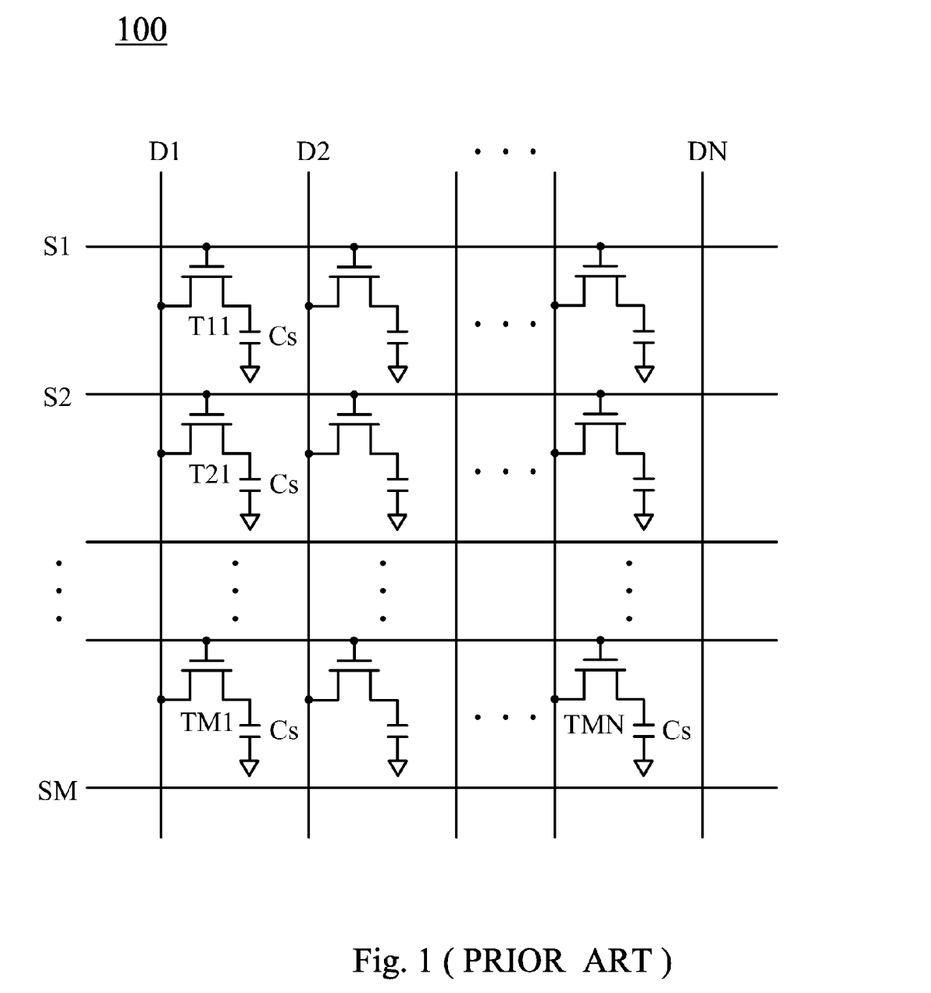
FIG. 1 is a schematic diagram of a conventional TFT array in the prior art.

For present active matrix display apparatus, such as Active Matrix Liquid Crystal Display (AMLCD), Active Matrix Organic Light-Emitting Diode (AMOLED), a thin-film transistor (TFT) array substrate having multiple thin-film transistors (TFT) is disposed therein. FIG. 1 is a schematic diagram depicting a transistor array 100 known in the prior art. The TFT array 100 is electrically coupled to M scan lines S1-SM and N data lines D1-DN. Moreover, the TFT array 100 includes M*N pixel transistors T11-TMN, and each of the pixel transistors T11-TMN is electrically coupled to one of the scan lines S1-SM and one of the data lines D1-DN. Each of the pixel transistors T11-TMN corresponds to one of the pixels in the pixel array (not shown in the figure).

As shown in FIG. 1, multiple pixel transistors are electrically coupled to one of the data lines. When one of the pixel transistors associated with the data line is turned on, the other pixel transistors associated with that data line are turned off. However, although the pixel transistors are turned off, a leakage current still occurs. As a result, when a data signal is provided to the turned-on pixel transistor, the pixel voltage for the corresponding pixel is not appropriate.

There are two different situations that the pixel transistors have leakage currents. The first one is that a leakage current generated by the pixel transistor sinks the current from the data line. For example, when the data signal is provided to the pixel transistor T11, if a leakage current generated by the pixel transistor T21 sinks the current from the data line D1, it will cause an insufficient pixel voltage of the pixel corresponding to the transistor T11. The second situation is that a leakage current generated by the pixel transistor flows into the data line. For example, when the data signal is provided to the pixel transistor T11, if a leakage current generated by the pixel transistor T21 flows into the data line D1, it will cause the pixel voltage of the pixel corresponding to the transistor T11 to be greater than it should be. In other words, when there is a leakage current generated by some pixel transistor, it will result in an inappropriate pixel voltage in the pixel, such that the pixels cannot display images with correct brightness, which leads to problems like color shift, image distortion, etc.

SUMMARY

An aspect of the present disclosure is related to a display apparatus including multiple pixels, a data line, a first current compensation unit, a second current compensation unit, and a first control unit. The data line is electrically coupled to the pixels. The first current compensation unit is electrically coupled to the data line and provides a first current through the data line to the pixels according to a voltage on the data line. The first current is configured for compensating the leakage current flowing out of the data line. The second current compensation unit is electrically coupled to the data line and sinks a second current from the pixels through the data line according to the voltage on the data line. The second current is configured for compensating the leakage current flowing into the data line. The first control unit controls the first current compensation unit to provide the first current or the second current compensation unit to sink the second current.

Another aspect of the present disclosure is related to a pixel driving method. The operation of the pixel driving method includes providing a first current to multiple pixels through a data line to compensate for a leakage current flowing out of the data line when a voltage on the data line electrically coupled to the pixels is pulled down. The operation also includes sinking a second current from the pixels through the data line to compensate for a leakage current flowing into the data line when the voltage on the data line is pulled up.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

The provided embodiments should not be used to limit the scope of this disclosure, and the descriptions for operation of structures are not used to limit the order of operation. Any apparatus with a structure recombining the components or elements to achieve the equivalent functions is covered by this disclosure. Moreover, the drawings are only for illustration and not in proportion to the original size. For better understanding, the following description will use the same symbol when referring to the same parts.

It will be understood that in the present disclosure, although the terms "first," "second," etc., may be used herein to describe various elements, these elements should not be limited by these terms. These terms are used to distinguish one element from another.

In the following description and claims, the terms "coupled" and "connected", along with their derivatives, may be used. In the present embodiments, "connected" and "coupled" may be used to indicate that two or more elements are in direct physical or electrical contact with each other, or may also mean that two or more elements may be in indirect contact with each other. "Coupled" and "connected" may still be used to indicate that two or more elements cooperate or interact with each other.

Figure 2:
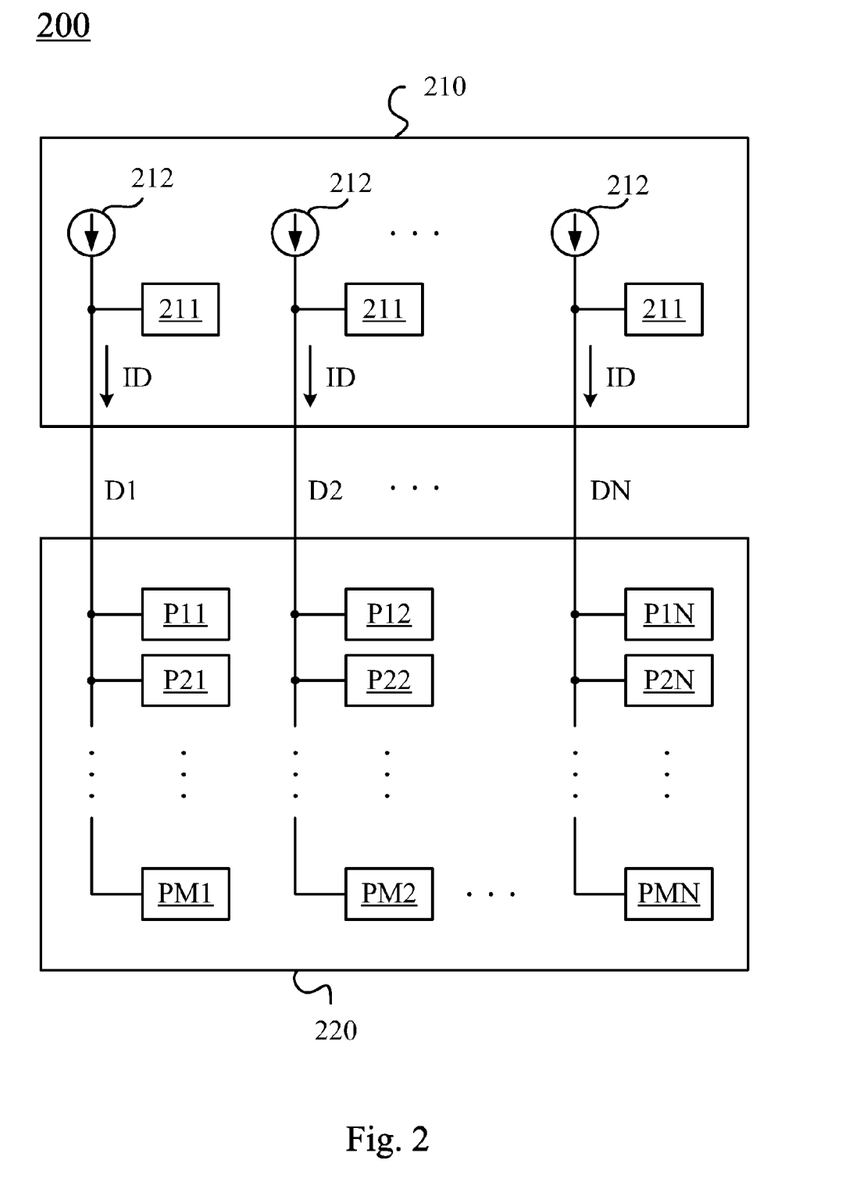
FIG. 2 is a schematic diagram of a display apparatus according to an embodiment of the present disclosure.

FIG. 2 is a schematic diagram of a display apparatus 200 according to an embodiment of the present disclosure. The display apparatus 200 includes a driver circuit 210, a pixel array 220, and N data lines D1-DN. The data lines D1-DN are electrically coupled to the driver circuit 210 and the pixel array 220. The driver circuit 210 includes N compensation modules 211 and N signal sources 212. The N compensation modules 211 are electrically coupled to the data lines D1-DN respectively, and the N signal sources 212 are electrically coupled to the data lines D1-DN respectively. The pixel array 220 further includes M*N pixels P11-PMN in N columns and M rows, and the N columns of pixels are electrically coupled to the data lines D1-DN respectively.

In one embodiment, the display apparatus 200 can be a display apparatus with a transistor array, such as Active Matrix Liquid Crystal Display (AMLCD) and Active Matrix Organic Light-Emitting Diode (AMOLED). However, the present disclosure is not limited thereto.

In one operation, the compensation module 211 is electrically coupled to the corresponding data line, so the compensation module 211 can be configured for detecting leakage currents of the M pixels (e.g., the pixels P11-PM1) associated with the data line. The compensation module 211 can provide a current to or sink a current from the M pixels to compensate for the leakage currents of these pixels. Therefore, when the driver circuit 210 provides data currents ID to the pixels P11-PMN of the pixel array 220 through the data lines D1-DN with the signal sources 212, it can be achieved that voltages at the pixels P11-PMN reach the rated pixel voltages. In other words, it can be achieved that each pixel displays images with the correct brightness by disposing the compensation module 211 in the driver circuit 210.

Figure 3:
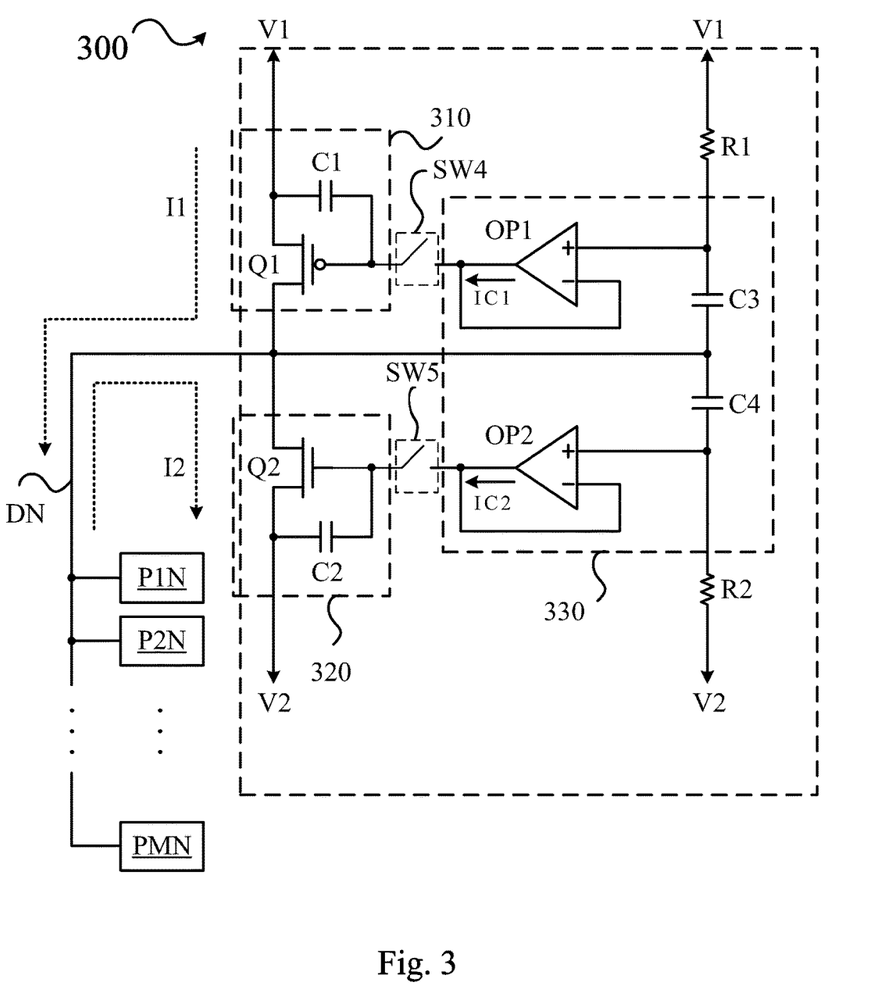
FIG. 3 is a schematic diagram of a compensation module according to the first embodiment of the present disclosure.

Referring to both FIG. 2 and FIG. 3, FIG. 3 is a schematic diagram of a compensation module 300 according to a first embodiment of the present disclosure. The compensation module 300 as shown in FIG. 3 can be applied to the display apparatus 200 in FIG. 2, but it is not limited thereto. For clarity and convenience of explanation, this embodiment and the following embodiments use only one compensation module to compensate pixels on one data line, but it is not limiting of the present disclosure.

As shown in FIG. 3, the compensation module 300 includes a first current compensation unit 310, a second current compensation unit 320 and a control unit 330. The first current compensation unit 310 and the second current compensation unit 320 are electrically coupled to the data line DN. The first current compensation unit 310 is configured for providing a first current I1 to pixels P1N-PMN through the data line DN according to a voltage on the data line DN. The first current I1 is configured for compensating the leakage current flowing out of the data line DN. The second current compensation unit 320 is configured for sinking a second current I2 from the pixels P1N-PMN through the data line DN according to the voltage on the data line DN. The second current I2 is configured for compensating the leakage current flowing into the data line DN. The control unit 330 is configured for controlling the first current compensation unit 310 to provide the first current I1 or controlling the second current compensation unit 320 to sink the second current I2, according to the voltage on the data line DN.

In one embodiment, the first current compensation unit 310 includes a first transistor Q1 and a first capacitor C1. A first end of the first transistor Q1 is electrically coupled to one end of the first capacitor C1 and configured for receiving a first operating voltage V1. A control end of the first transistor Q1 is electrically coupled to the other end of the first capacitor C1. A second end of the first transistor Q1 is electrically coupled to the data line DN.

Similarly, the second current compensation unit 320 includes a second transistor Q2 and a second capacitor C2. A first end of the second transistor Q2 is electrically coupled to one end of the second capacitor C2 and configured for receiving a second operating voltage V2. A control end of the second transistor Q2 is electrically coupled to the other end of the second capacitor C2. A second end of the second transistor Q2 is electrically coupled to the data line DN.

The control unit 330 includes a first operational amplifier OP1, a second operational amplifier OP2, a third capacitor C3 and a fourth capacitor C4. The first operational amplifier OP1 has a first non-inverting input end, a first inverting input end and a first output end. The first non-inverting input end is configured for receiving the first operating voltage V1 through a resistor R1 and is electrically coupled to one end of the third capacitor C3. The other end of the third capacitor C3 is electrically coupled to the data line DN. The first output end of the first operational amplifier OP1 is electrically coupled to the first inverting input end and the control end of the first transistor Q1. There is a switch SW4 between the first current compensation unit 310 and control unit 330 but the switch SW4 is not necessary. Similarly, the second operational amplifier OP2 has a second non-inverting input end, a second inverting input end and a second output end. The second non-inverting input end is configured for receiving the second operating voltage V2 through a resistor R2 and is electrically coupled to one end of the fourth capacitor C4. The other end of the fourth capacitor C4 is electrically coupled to the data line DN. The second output end is electrically coupled to the second inverting input end and the control end of the second transistor Q2. There is a switch SW5 between the second current compensation unit 320 and control unit 330 but the switch SW5 is not necessary.

In an embodiment, the first transistor Q1 can be a P-type metal-oxide-semiconductor field-effect transistor (PMOS), and the second transistor Q2 can be an N-type Metal Oxide-Semiconductor Field-Effect Transistor (NMOS). The first operating voltage V1 can be at high logic level, and the second operating voltage V2 can be at low logic level (e.g., ground voltage). However, the present disclosure is not limited thereto. In other words, one of ordinary skill in the art can design different transistors to realize the functions of the first transistor Q1 and second transistor Q2 without departing from the spirit and scope of the present disclosure.

In one operation, assuming the pixel P1N is turned on while the other pixels P2N-PMN are turned off. The voltage on the data line DN does not change when pixels P2N-PMN do not have leakage currents. At the moment, the first operational amplifier OP1 generates a first control signal IC1 to the first transistor Q1 according to the first operating voltage V1. Since there is no change in the voltage of the data line DN, the level of the first control signal IC1 is approximately the same as that of the first operating voltage V1. Therefore, the first transistor Q1 is operated in a cut-off state. Similarly, the second operational amplifier generates a second control signal IC2 to the second transistor Q2 according to the second operating voltage V2. Since the level of the second control signal IC2 is also approximately the same as that of the second operating voltage V2, thus the second transistor Q2 is also operated in a cut-off state. In other words, when the pixels P2N-PMN associated with the data line DN do not have leakage current, the first current compensation unit 310 and the second current compensation unit 320 are not operating.

In another operation, when the leakage current generated by turned-off pixels P2N-PMN sinks a current from the data line DN (i.e., the leakage current flows out of the data line), it causes the voltage of the data line DN to be pulled down. At the moment, the first non-inverting input end of the first operational amplifier OP1 receives an input signal with its level lower than that of the first operating voltage V1 through the coupling effect of the third capacitor C3, such that the level of the first control signal IC1 generated by the first operational amplifier OP1 is smaller than that of the first operating voltage V1. In the present embodiment, the first transistor Q1 is a PMOS, so the first transistor Q1 is conducted and the first current I1 is generated. In other words, the first current I1 is provided to the pixels P1N-PMN through the data line DN. The first current I1 can be configured to compensate for the leakage current flowing out of the data line DN.

Since the voltages on both ends of the first capacitor C1 are not identical, the first capacitor C1 is charged to a first voltage. The level of the first voltage is determined by the voltage drop on the data line DN, which means the level of the first voltage is determined by the value of the leakage current. To be specific, when the first transistor Q1 is conducted, the voltage between the first end and the control end of the first transistor Q1 is clamped to the first voltage by the first capacitor C1. The drain current (e.g., the first current I1) generated by a metal-oxide-semiconductor field-effect transistor (MOSFET) is related to the voltage difference (e.g. the first voltage) between its gate electrode and source electrode, and the first voltage is determined by the leakage current. As a result, when the voltage difference between the first end and the control end of the first transistor Q1 is clamped to the first voltage, the first current I1 generated by the first transistor Q1 can be adjusted to approximately equal to the leakage current.

On the other hand, when the voltage on the data line DN is pulled down, the second non-inverting input end of the second operational amplifier OP2 receives an input signal smaller than the second operating voltage V2 through the coupling effect of the fourth capacitor C4. As a result, the level of the second control signal IC2 generated by the second operational amplifier OP2 is smaller than that of the second operating voltage V2. Since the second transistor Q2 in this embodiment is an NMOS, the second transistor Q2 is turned off, which means the second current compensation unit 320 is not operating.

In short, when the voltage on the data line DN is pulled down, the first current compensation unit 310 provides the first current I1 to pixels P1N-PMN through the data line DN to compensate for the leakage current flowing out of the data line DN.

In another operation, when the leakage current generated by the turned-off pixels P2N-PMN flows into the data line DN, the voltage on the data line DN is pulled up. At the moment, the second non-inverting input end of the second operational amplifier OP2 receives an input signal with its level higher than that of the second operating voltage V2 through the coupling effect of the fourth capacitor C4, such that the level of the second control signal IC2 generated by the second operational amplifier OP2 is higher than that of the second operating voltage V2. Therefore, the second transistor Q2 is conducted and the second current I2 is generated. In other words, the second current I2 is sunken from the pixels P1N-PMN through the data line DN. The second current I2 can be configured to compensate for the leakage current flowing into the data line DN.

Similarly, since the voltages on both ends of the second capacitor C2 are not identical, the second capacitor C2 is charged to a second voltage. The level of the second voltage is determined by the voltage increase on the data line DN, which means the level of the second voltage is also determined by the leakage current. To be specific, when the second transistor Q2 is conducted, the voltage between the first end and the control end of the second transistor Q2 is clamped to the second voltage by the second capacitor C2. Therefore, the second current I2 generated by the second transistor Q2 can be adjusted to approximately equal to the leakage current.

On the other hand, when the voltage on the data line DN is pulled up, the first non-inverting input end of the first operational amplifier OP1 receives an input signal with its level higher than that of the first operating voltage V1 through the coupling effect of the third capacitor C3, such that the level of the first control signal IC1 generated by the first operational amplifier OP1 to be substantially greater than that of the first operating voltage V1. Therefore, the first transistor Q1 is controlled to be in a cut-off state, which means the first current compensation unit 310 is not operating.

In short, when the voltage on the data line DN is pulled up, the second current compensation unit 320 sinks the second current I2 from the pixels P1N-PMN through the data line DN to compensate for the leakage current flowing into the data line DN.

From the above-described embodiment, the direction of the leakage current generated by the pixels P1N-PMN associated with the data line DN can be known through configuring the control unit 330 to detect the voltage on the data line DN. After that, depending on the direction of the leakage current, the control unit 330 can control the first current compensation unit 310 to provide the first current I1 to the data line DN or control the second current compensation unit 320 to sink the second current I2 from the data line DN, respectively. By doing so, when the signal source (not shown in the figure) provides the data currents to the pixels, it can be achieved that the voltages at the pixels P11-PMN reach the rated pixel voltages.

Figure 4:
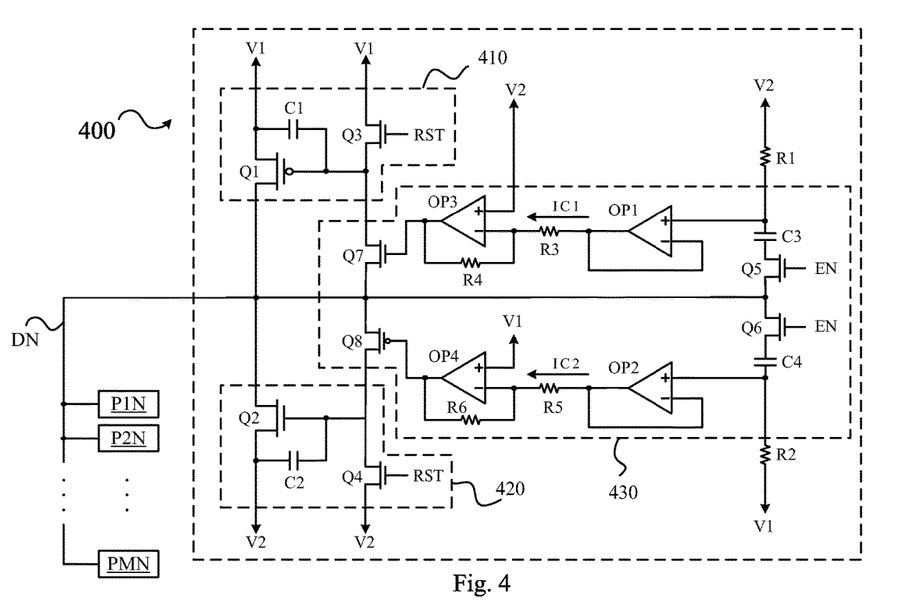
FIG. 4 is a schematic diagram of a compensation module according to the second embodiment of the present disclosure.

FIG. 4 is a schematic diagram of a compensation module 400 according to a second embodiment of the present disclosure. The compensation module 400 in FIG. 4 can be applied to the display apparatus 200 in FIG. 2, but is not limited thereto.

The compensation module 400 includes a first current compensation unit 410, a second current compensation unit 420 and a control unit 430. Similarly, the first current compensation unit 410 includes the first transistor Q1 and the capacitor C1, and the second current compensation unit 420 includes the second transistor Q2 and the second capacitor C2. The connection and operation thereof are similar to those illustrated in the aforementioned embodiments and thus they are not further detailed herein.

In one embodiment, the first current compensation unit 410 and the second current compensation unit 420 also have a third transistor Q3 and a fourth transistor Q4, respectively. A first end of the third transistor Q3 is configured for receiving the first operating voltage V1. A control end of third transistor Q3 is configured for receiving a reset signal RST. A second end of the third transistor Q3 is electrically coupled to the control end of the first transistor Q1. A first end of the fourth transistor Q4 is configured for receiving the second operating voltage V2. A control end of the fourth transistor Q4 is configured for receiving the reset signal RST. A second end of the transistor Q4 is electrically coupled to the control end of the second transistor Q2.

When the level of the reset signal RST is at high logic level, the third transistor Q3 and the fourth transistor Q4 are conducted. At the moment, the first capacitor C1 and the second capacitor C2 discharge through the third transistor Q3 and the fourth transistor Q4 respectively. In other words, the first current compensation unit 410 and the second current compensation unit 420 can discharge the first capacitor C1 and the second capacitor C2 according to the reset signal RST. Furthermore, when writing the data current into the pixel P1N is completed, the pixel P1N is turned off. After that, pixel P2N is turned on, and the driver circuit (not shown in the figure) prepares to write the data current into the pixel P2N. At the moment, the compensation module 400 can enable the third transistor Q3 and the fourth transistor Q4 to fully discharge the first capacitor C1 and the second capacitor C2 to zero according to the reset signal RST. As a result, the first current compensation unit 410 or the second current compensation 420 can store another first voltage or another second voltage according to the manner that the other pixels generate leakage currents in order to compensate for the leakage currents generated by the other pixels when the pixel P2N is turned on.

In one embodiment, the third capacitor C3 and the fourth capacitor C4 are further electrically coupled to the data line DN through a fifth transistor Q5 and a sixth transistor Q6, respectively. Control ends of the fifth transistor Q5 and the sixth transistor Q6 are both configured for receiving an enable signal EN. When the level of the enable signal EN is at high logic level, the control unit 430 can detect the voltage of the data line DN and control the first current compensation unit 410 or the second current compensation unit 420 to operate according to the detection result.

In one embodiment, control unit 430 further includes a third operational amplifier OP3, a fourth operational amplifier OP4, a seventh transistor Q7 and an eighth transistor Q8. The third operational amplifier OP3 has a third non-inverting input end, a third inverting input end and a third output end. The third non-inverting input end is configured for receiving the second operating voltage V2. The third inverting input end is electrically coupled to the first output end of the first operational amplifier OP1 through a resistor R3. The third output end is electrically coupled to the third inverting input end through a resistor R4. A fourth operational amplifier OP4 has a fourth non-inverting input end, a fourth inverting input end an a fourth output end. The fourth non-inverting input end is configured for receiving the first operating voltage V1. The fourth inverting input end is electrically coupled to the second output end of the second operational amplifier through a resistor R5. The fourth output end is electrically coupled to the fourth inverting input end through a resistor R6.

A first end of the seventh transistor Q7 is electrically coupled to the control end of the first transistor Q1. A control end of the seventh transistor Q7 is electrically coupled to the third output end. A second end of the seventh transistor Q7 is electrically coupled to the data line DN. A first end of the eighth transistor Q8 is electrically coupled to the control end of the second transistor Q2. A control end of the eighth transistor Q8 is electrically coupled to the fourth output end. A second end of the eighth transistor Q8 is electrically coupled to the data line DN. In one embodiment, the seventh transistor Q7 can be an NMOS, and the eighth transistor Q8 can be a PMOS. However, the present disclosure is not limited thereto.

In the present embodiment, the first non-inverting input end of the first operational amplifier OP1 and the second non-inverting input end of the second operational amplifier OP2 are configured for receiving the second operating voltage V2 and the first operating voltage V1 through the resistor R1 and the resistor R2, respectively.

In one operation, when the voltage on the data line DN is pulled down, the first control signal IC1 generated by the first operational amplifier OP1 controls the seventh transistor Q7 to conduct through the third operational amplifier OP3. At the moment, one end of the first capacitor C1 is electrically coupled to the data line DN so that the first capacitor C1 is charged to the first voltage according to how much the voltage on the data line DN is pulled down. At the moment, the second control signal IC2 generated by the second operational amplifier OP2 controls the eighth transistor Q8 to be in a cut-off state through the fourth operational amplifier OP4.

Similarly, when the voltage on the data line DN is pulled up, the second signal IC2 generated by the second operational amplifier OP2 controls the eighth transistor Q8 to conduct through the fourth operational amplifier OP4. At the moment, one end of the second capacitor C2 is electrically coupled directly to the data line DN so that the second capacitor C2 is charged to the second voltage directly according to how much the voltage on the data line DN is pulled up. At the moment, the first control signal IC1 generated by the first operational amplifier OP1 controls the seventh transistor Q7 to be in a cut-off state through the third operational amplifier OP3.

In this embodiment, the third operational amplifier OP3 and the fourth operational amplifier OP4 are operated as gain stages for the first operational amplifier OP1 and the second operational amplifier OP2, respectively, so as to increase the speed of clamping the voltage of the first capacitor C1 to the first voltage and the voltage of the second capacitor C2 to the second voltage. Moreover, the accuracy of the first current compensation unit 410 providing the first current I1 and the second current compensation unit 420 sinking the second current I2 is improved by directly coupling both the first capacitor C1 and the second capacitor C2 to the data line DN. In other words, the value of the first current I1 and the value of the second current I2 can approach the value of the leakage current more accurately.

Figure 5:
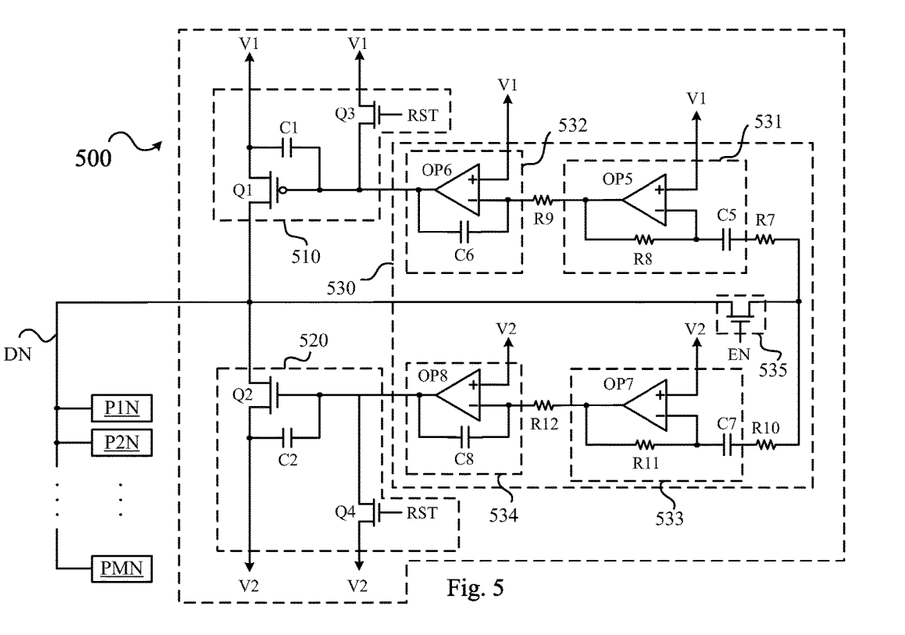
FIG. 5 is a schematic diagram of a compensation module according to the third embodiment of the present disclosure.

FIG. 5 is a schematic diagram of a compensation module 500 according to a third embodiment of the present disclosure. The compensation module 500 shown in FIG. 5 can be applied to the display apparatus 200 shown in FIG. 2 but is not limited thereto.

The compensation module 500 includes a first current compensation module 510, a second current compensation unit 520, and a control unit 530. Similarly, the first current compensation unit 510 includes the first transistor Q1, the third transistor Q3, and the first capacitor C1. The second current compensation unit 520 includes the second transistor Q2, the fourth transistor Q4, and the second capacitor C2. The connection and operation thereof are similar to those illustrated in the aforementioned embodiments and thus they are not further detailed herein.

In an embodiment, the control unit 530 includes a first differentiator 531, a first integrator 532, a second differentiator 533, a second integrator 534, and a switch 535. A first end of the first differentiator 531 is configured for receiving the first operating voltage V1. A second end of the first differentiator 531 is electrically coupled to a first end of switch 535. A first end of the first integrator 532 is configured for receiving the first operating voltage V1. A second end of the first integrator 532 is electrically coupled to an output end of the first differentiator 531 and an output end of the first integrator 532. Similarly, a first end of the second differentiator 533 is configured for receiving the second operating voltage V2. A second end of the second differentiator 533 is electrically coupled to the first end of the switch 535. A first end of the second integrator 534 is configured for receiving the second operating voltage V2. A second end of the second integrator 534 is electrically coupled to an output end of the second differentiator 533 and an output end of the second integrator 534. A control end of switch 535 is configured to receive the enable signal EN. A second end of the switch 535 is electrically coupled to the data line DN.

In an operation, when the enable signal EN turns on the switch 535, the control unit 530 detects the voltage signal on the data line DN through the first differentiator 531 and the second differentiator 533. The voltage signal on the data line DN is differentiated through the first differentiator 531 and the second differentiator 533 and the results are outputted to the first integrator 532 and the second integrator 534 respectively. The first integrator 532 and the second integrator 534 can take integral of the differentiated voltage signal to restore the original voltage signal on the data line DN and provide the restored voltage signal to the first current compensation unit 510 and the second current compensation unit 520, respectively, so as to control the first current compensation unit 510 to provide the first current I1 to the data line DN, or to control the second current compensation unit 520 to sink the second current I2 form the data line DN.

In one embodiment, the first differentiator 531, the first integrator 532, a second differentiator 533 and a second integrator 534 include a fifth operational amplifier OP5, a sixth operational amplifier OP6, a seventh operational amplifier OP7, and an eighth operational amplifier OP8, respectively. The fifth operational amplifier OP5 has a fifth non-inverting input end, a fifth inverting input end and a fifth output end. The fifth non-inverting input end is configured for receiving the first operating voltage V1. The fifth inverting input end is electrically coupled to the first end of the switch 535 through a fifth capacitor C5 and a resistor R7. The fifth output end is electrically coupled to the fifth inverting input end through a resistor R8. The sixth operational amplifier OP6 has a sixth non-inverting input end, a sixth inverting input end and a sixth output end. The sixth non-inverting input end is configured for receiving the first operating voltage V1. The sixth inverting input end is electrically coupled to the fifth output end through a resistor R9. The sixth output end is electrically coupled to the sixth inverting input end through a sixth capacitor C6 and electrically coupled to the control end of the first transistor Q1.

The seventh operational amplifier OP7 has a seventh non-inverting input end, a seventh inverting input end and a seventh output end. The seventh non-inverting input end is configured for receiving the second operating voltage V2. The seventh inverting input end is electrically coupled to the first end of the switch 535 through a seventh capacitor C7 and a resistor R10. The seventh output end is electrically coupled to the seventh inverting input end through a resistor R11. The eighth operational amplifier OP8 has an eighth non-inverting input end, an eighth inverting input end and an eighth output end. The eighth non-inverting input end is configured for receiving the second operating voltage V2. The eighth inverting input end is electrically coupled to the seventh output end through a resistor R12. The eighth output end is electrically coupled to the eighth inverting input end through an eighth capacitor C8 and electrically coupled to the control end of the second transistor Q2.

In this embodiment, the control unit 530 can filter out the DC signal in the voltage signal on the data line DN by disposing the first differentiator 531 and the first integrator 532 to control the first current compensation unit 510 and disposing the second differentiator 533 and the second integrator 534 to control the second current compensation unit 520.

On the other hand, reference is made to FIG. 2. Since the pixels display images with different brightness, which means that the pixel voltages of the pixels are different from each other, the driver circuits 210 provide the data currents ID through the signal sources 212 to the pixels according to the pixel voltages required by the pixels. For example, when a lower level is required for the pixel voltage of one pixel, one of the signal sources 212 provides a smaller data current ID to the pixel. However, when the data current ID is too small, e.g., 10 Nanoampere (nA), it causes the time for writing the data current into the pixel to be too long, and further affects the efficiency of the display apparatus 200 displaying images.

Figure 6:
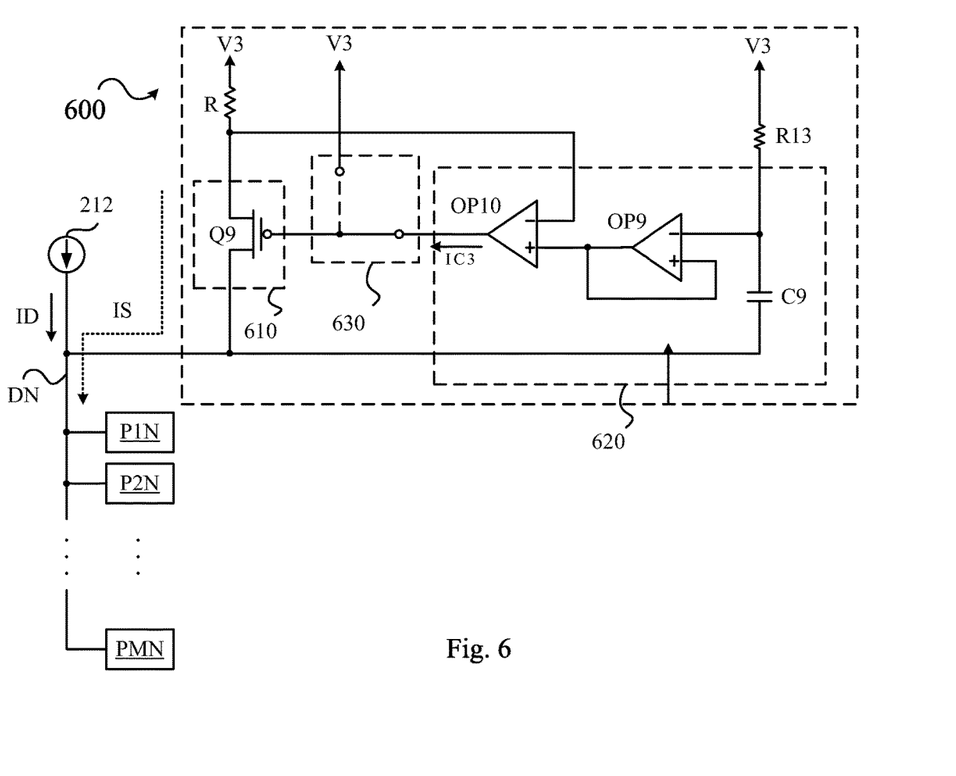
FIG. 6 is a schematic diagram of a compensation module according to the fourth embodiment of the present disclosure.

As a result, this disclosure provides another embodiment to solve the above-mentioned problem. FIG. 6 is a schematic diagram of a compensation module 600 according to a fourth embodiment of the present disclosure. The compensation module 600 in FIG. 6 can be applied to the display apparatus 200 shown in FIG. 2 but is not limited thereto.

In one embodiment, the compensation module 600 includes a current driver unit 610, a control unit 620, and a selector 630. The current driver 610 is electrically coupled to the control unit 620 through the selector 630. The current driver unit 610 is electrically coupled to the data line DN and configured for generating a drive current IS according to the voltage on the data line DN. When one of the signal sources 212 provides the data current ID to the data line DN, the control unit 620 generates a third control signal IC3. The third control signal IC3 is configured for controlling the current driver unit 610 to generate the drive current IS to the data line DN. The drive current IS and the data current ID flow in the same direction on the data line DN and flow to the pixel P1N-PMN through the data line DN. The selector 630 is configured for receiving a third operating voltage V3 or the third control signal IC3 selectively. In this embodiment, the third operating voltage V3 is at high logic level but is not limited thereto.

To be specific, the current driver unit 610 includes a ninth transistor Q9. A first end of the ninth transistor Q9 is configured for receiving the third operating voltage V3 through a resistor R. A control end of the ninth transistor Q9 is electrically coupled to the selector 630. In other words, the control end of the ninth transistor Q9 selectively receives the third operating voltage V3 or the third control signal IC3 through the selector 630. A second end of the ninth transistor Q9 is electrically coupled to the data line DN.

The control unit 620 includes a ninth operational amplifier OP9, a tenth operational amplifier OP10 and a ninth capacitor C9. The ninth operational amplifier OP9 has a ninth non-inverting input end, a ninth inverting input end and a ninth output end. The ninth inverting input end is electrically coupled to the data line DN through the ninth capacitor C9 and receives the third operating voltage V3 through a resistor R13. The ninth non-inverting input end is electrically coupled to the ninth output end. The tenth operational amplifier OP10 has a tenth non-inverting input end, a tenth inverting input end and a tenth output end. The tenth inverting input is electrically coupled to the first end of the ninth transistor Q9. The tenth non-inverting input end is electrically coupled to the ninth output end. The tenth output end is electrically coupled to the control end of the ninth transistor Q9 through the selector 630.

In one operation, assuming that the pixel P1N is turned on and the other pixels P2N-PMN are turned off, when one of the signal sources 212 provides the data current ID through the data line DN, the selector 630 is configured for receiving the third control signal IC3. At the moment, the voltage on the data line DN is pulled up immediately, and the level of the third control signal IC3 generated by the control unit 620 through the ninth operational amplifier OP9 and the tenth operational amplifier OP10 is lower than that of the third operating voltage V3. Therefore, the ninth transistor Q9 in the current driver unit 610 is conducted by the third control signal IC3, and the drive current IS is generated and flows into the data line DN. Since the data current ID and the drive current IS flow in the same direction, both the data current ID and the drive current IS are configured to be written into the pixel P1N such that the speed of charging a storage capacitor CS of the pixel P1N increases (i.e., increasing the speed of generating the pixel voltage).

Moreover, after the ninth transistor Q9 is conducted for a period of time, the voltage on the data line DN becomes stable (i.e., the voltage on the data line DN do not change anymore). At the moment, the third control signal IC3 generated by the control unit 620 controls the ninth transistor Q9 to be turned off, and thus the current driver unit 610 stops generating the drive current IS, which means that only the data current ID is provided to the pixel P1N. As a result, the predetermined pixel voltage can be expectedly generated at the pixel P1N.

It is worth mentioning that the current driver unit 610 and the control unit 620 in the compensation module 600 as shown in FIG. 6 can be combined with any compensation module of the above-described embodiments, so as to achieve the effect of accelerating the writing operations of the data current to the pixels and improve the accuracy of generating the pixel voltages at the pixels.

Figure 7:
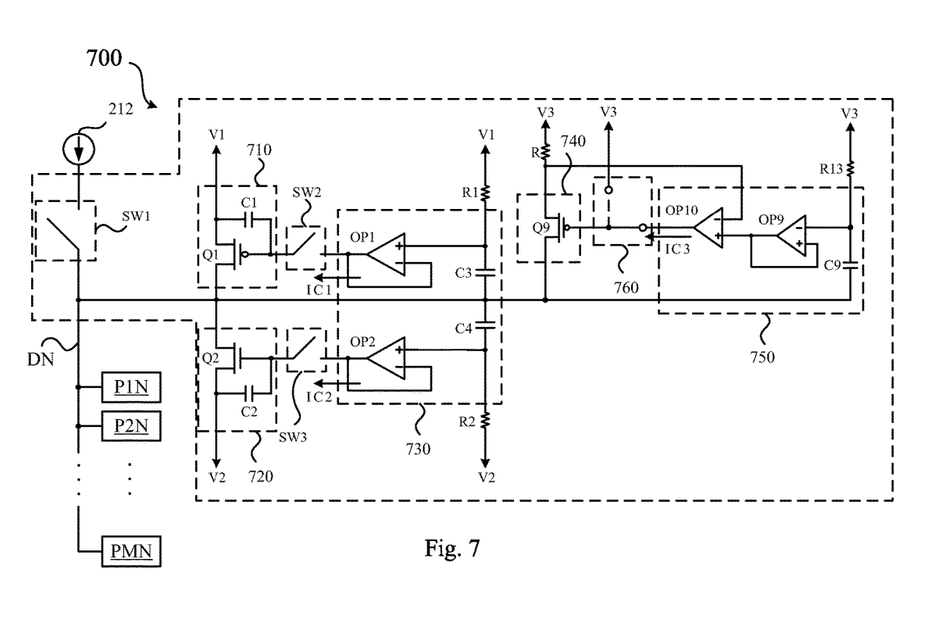
FIG. 7 is a schematic diagram of a compensation module according to the fifth embodiment of the present disclosure.

FIG. 7 is a schematic diagram of a compensation module 700 according to a fifth embodiment of the present disclosure. Illustratively, the compensation module 700 shown in FIG. 7 is formed by combining the compensation module 300 shown in FIG. 3 and the compensation module 600 shown in FIG. 6 but is not limited thereto. In other words, one of ordinary skill in the art can combine the compensation module 600 with any compensation module shown in FIG. 3 to FIG. 5 to implement the compensation module 700 and to achieve the effect thereof, without departing from the spirit and scope of the present disclosure.

As shown in FIG. 7, the compensation module 700 includes a first current compensation unit 710, a second current compensation unit 720, a first control unit 730, a current driver unit 740, a second control unit 750, a selector 760, a switch SW1, a switch SW2, and a switch SW3. The operation and connection of the first current compensation unit 710, the second current compensation unit 720, the first control unit 730, the current driver unit 740, the second control unit 750 and the selector 760 are similar to those illustrated in the aforementioned embodiments so not detailed herein.

In one embodiment, the signal source 212 is electrically coupled to the data line DN through the switch SW1. The first current compensation unit 710 and the second current compensation unit 720 are electrically coupled to the first control unit 730 through the switch SW2 and the switch SW3, respectively. In the present embodiment, the first operating voltage V1 and the third operating voltage V3 are at high logic level, and the second operating voltage V2 is at low logic level. However, the present disclosure is not limited thereto.

In an operation, when the signal source 212 provides the data current ID to the pixel P1N, the switch SW1 is turned off, both of the switch SW2 and the switch SW3 are turned on, and the selector 760 is configured for selecting the third operating voltage V3. At the moment, the first control unit 730 is configured for detecting the voltage on the data line DN (i.e., detecting if there is any leakage current generated by the pixel P2N-PMN associated with the data line DN), and generates the first control signal IC1 and the second control signal IC2. When the voltage on the data line DN is pulled down, the first control signal IC1 is configured for controlling the first current compensation unit 710 to provide the first current I1 to the pixel P1N through the data line DN. When the voltage on the data line DN is pulled up, the second control signal IC2 is configured for controlling the second current compensation unit 720 to sink the second current I2 from the pixel P1N through the data line DN. Moreover, the first control unit 730 further clamps the voltage across the first transistor Q1 in the first current compensation module 710 or the voltage across the second transistor Q2 in the second current compensation unit 720 to the first voltage (e.g., through the first capacitor C1) or the second voltage (e.g., through the second capacitor C2) respectively according to the voltage of the data line DN. The connection and operation thereof are similar to those illustrated in the aforementioned embodiments and thus they are not further detailed herein.

When the signal source 212 provides the data current ID to the pixel P1N, the switch SW1 is turned on, both of the switch SW2 and the switch SW3 are turned off, and the selector 760 is configured for receiving the third control signal IC3. Since the switch SW2 and the switch SW3 are both turned off, the first control unit 730 does not control the first current compensation unit 710 and the second compensation unit 720. Moreover, since the voltage across the first transistor Q1 in the first current compensation unit 710 is clamped to the first voltage or the voltage across the second transistor Q2 in the second current compensation unit 720 is clamped to the second voltage, the compensation module 700 provides the first current I1 to the pixel P1N by the first current compensation unit 710 through the data line DN or sinks the second current I2 from the pixel P1N by the second current compensation module 720 through the data line DN, according to the variation (pulled up or down) of the voltage on the data line DN, in order to compensate for the leakage currents generated by the other pixels associated with the data line DN. By doing so, when the signal source 212 provides the data current ID to the pixel P1N, the rated pixel voltage on the pixel P1N can be reached through the driver circuit (not shown in the figure), such that the pixel P1N can display images with the correct brightness.

On the other hand, when the signal source 212 provides the data current ID to the pixel P1N, the second control unit 750 generates the third control signal IC3 transmitted to the current driver unit 740 through the selector 760. When the switch SW1 is turned on, the voltage on the data line DN is pulled up immediately, such that the level of the third control signal IC3 is lower than that of the third operating voltage V3. Therefore, the ninth transistor Q9 in the current driver unit 740 is conducted by the third control signal IC3, and the drive current IS is generated and flows to the pixel P1N through the data line DN. The drive current IS is configured for increasing the speed of writing the data current ID into the pixel P1N. Reference is made to the aforementioned embodiments in regard to details of the operations, and thus the operations are not further detailed herein. By increasing the speed of generating pixel voltage on the pixel P1N, the efficiency of image display on the display apparatus (not shown in the figure) can be improved.

Figure 8:
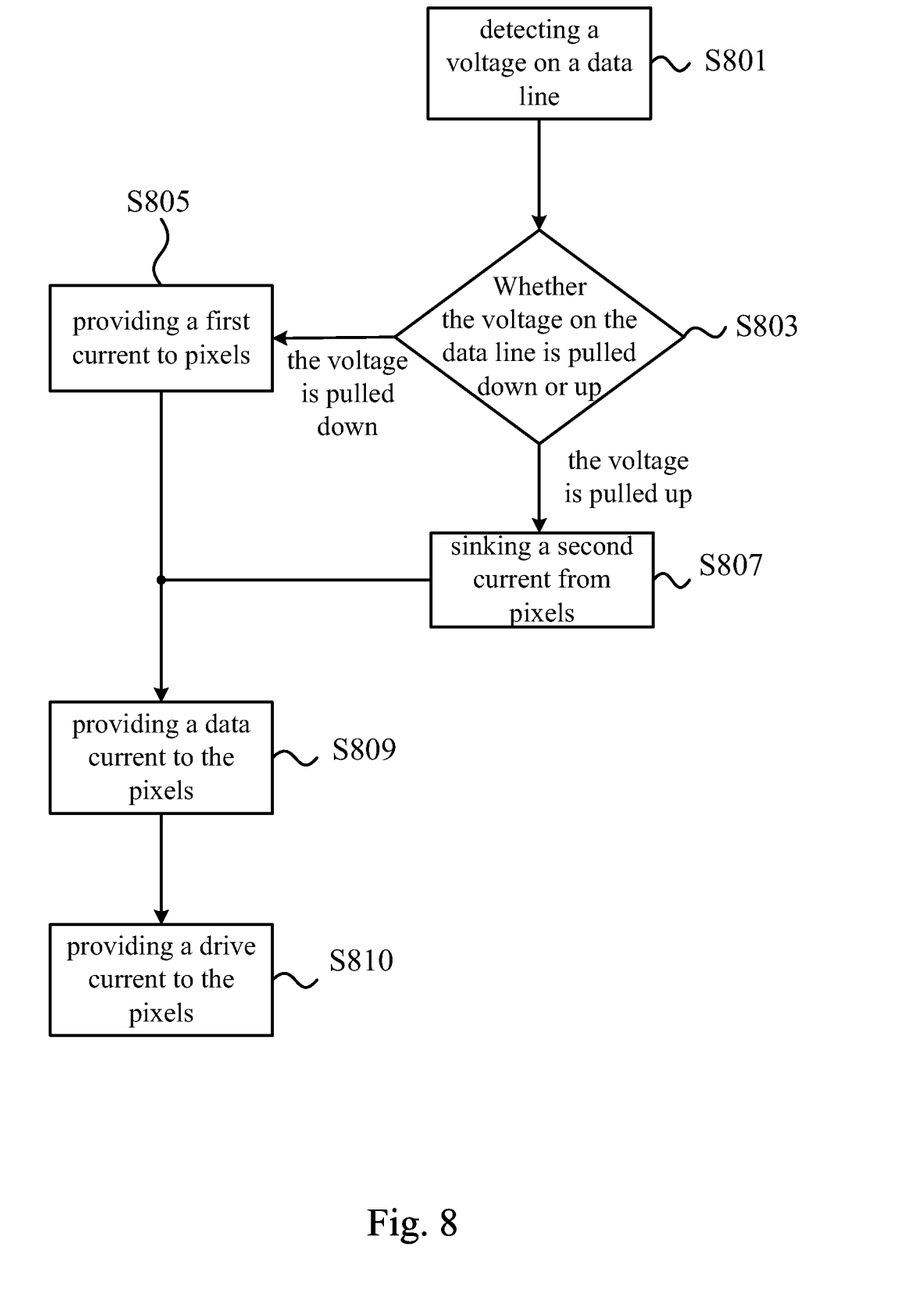
FIG. 8 is a flow chart of a pixel driving method according to one embodiment of the present disclosure.

FIG. 8 is a flow chart of a pixel driving method according to one embodiment of the present disclosure. For convenience and clarity of explanation, the following explanation of the pixel driving method takes the compensation module 700 shown in FIG. 7 as an example, but the disclosure is not limited thereto.

First of all, in operation S801, before the signal source 212 provides the data current ID to the pixel P1N-PMN through the data line DN, the voltage of the data line DN is detected by the first control unit 730. After that, in operation S803, whether the voltage of the data line DN is pulled down or up (i.e., whether the pixels generate a leakage current and how it is generated) is determined by the first control unit 730.

When the voltage on the data line DN is pulled down, operation S805 is performed, in which the first current compensation unit 710 is enabled with the first control signal IC1 generated by the first control unit 730, i.e., controlling the first transistor Q1 between the first operating voltage V1 and the data line DN to conduct so that the first current compensation unit 710 provides the first current I1 flowing to the pixels P1N-PMN through the data line DN to compensate for the leakage current flowing out of the data line DN. Moreover, the voltage between the first end and the control end of the first transistor Q1 is clamped to the first voltage with the first capacitor C1 in the first current compensation unit 710, and the first voltage is adjusted according to the voltage on the data line DN.

When the voltage on the data line DN is pulled up, operation S807 is performed, in which the second current compensation unit 720 is enabled with the second control signal IC2 generated by the first control unit 730, i.e., controlling the second transistor Q2 between the second operating voltage V2 and the data line DN to conduct so that the second current compensation unit 710 sinks the second current I2 from the pixel P1N-PMN through the data line DN to compensate for the leakage current flowing into the data line DN. Moreover, the voltage between the first end and the control end of the second transistor Q2 is clamped to the second voltage with the second capacitor C2 in the second current compensation unit 720, and the second voltage is adjusted according to the voltage on the data line DN.

After completion of providing the first current I1 to the pixel P1N-PMN with the first current compensation unit 710 or sinking the second current I2 from the pixel P1N-PMN with the second current compensation unit 720, operation S809 is performed, in which the data current ID is provided to the pixel P1N-PMN through the data line DN with the signal source 212. After that, the current driver unit 740 is enabled by the third control signal IC3 generated with the second control unit 750, which means controlling the ninth transistor Q9 between the third operating voltage V3 and the data line DN to conduct so that the current driver unit 740 generates the driving current IS to the data line DN. The driving current IS and the data current ID flow in the same direction on the data line DN and flow to the pixel P1N-PMN through the data line DN.

As can be known from the aforementioned embodiments of the disclosure, the leakage currents generated by the pixels associated with the data lines can be compensated by providing the first current to or sinking the second current from the pixels in the pixel array through the compensation module disposed in the driver circuit in the display apparatus. As a result, when the driver circuit provides the data current to the pixels through the data lines, the pixel voltages at the pixels, which are generated according to the operation of the driver circuit, can reach rated voltage, such that the pixels display images with the correct brightness. On the other hand, when the data current provided by the driver circuit is too small, the compensation module can provide the driving current such that the driving current together with the data current can be written into the pixels to increase the speed of generating pixel voltages at the pixels in response to the operation of the driver circuit, further improving the efficiency of the display apparatus displaying images.

Although the present invention has been described in considerable detail with reference to certain embodiments thereof, other embodiments are possible. Therefore, the spirit and scope of the appended claims should not be limited to the description of the embodiments contained herein.

It is apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A display apparatus, comprising:
   a plurality of pixels;
   a data line electrically coupled to the pixels;
   a first current compensation unit electrically coupled to the data line and configured for providing a first current to the pixels through the data line according to a voltage of the data line to compensate a leakage current that flows out of the data line, wherein the first current compensation unit comprises:
   a first capacitor; and
   a first transistor, wherein a first end of the first transistor is electrically coupled to one end of the first capacitor and configured for receiving a first operating voltage, a control end of the first transistor is electrically coupled to the other end of the first capacitor, and a second end of the first transistor is electrically coupled to the data line;
   a second current compensation unit electrically coupled to the data line and configured for sinking a second current from the pixels through the data line according to the voltage on the data line to compensate a leakage current that flows into the data line, wherein the second current compensation unit comprises:
   a second capacitor; and
   a second transistor, wherein a first end of the second transistor is electrically coupled to one end of the second capacitor and configured for receiving a second operating voltage, a control end of the second transistor is electrically coupled to the other end of the second capacitor, and a second end of the second transistor is electrically coupled to the data line;

a first control unit configured for controlling the first current compensation unit to provide the first current or controlling the second current compensation unit to sink the second current according to the voltage on the data line;

a third transistor, wherein a first end of the third transistor is configured for receiving the first operating voltage, a control end of the third transistor is configured for receiving a reset signal, and a second end of the third transistor is electrically coupled to the control end of the first transistor; and a fourth transistor, wherein a first end of the fourth transistor is configured for receiving the second operating voltage, a control end of the fourth transistor is configured for receiving the reset signal, and a second end of the fourth transistor is electrically coupled to the control end of the second transistor;

wherein when the reset signal turns on the third transistor and the fourth transistor, the first capacitor and the second capacitor discharges through the third transistor and the fourth transistor, respectively.

2. The display apparatus as claimed in claim 1, wherein the first control unit comprises:

a first operational amplifier having a first non-inverting input end, a first inverting input end and a first output end, wherein the first non-inverting input end is electrically coupled to the data line, the first output end is electrically coupled to the first inverting input end and the control end of the first transistor;

a second operational amplifier having a second non-inverting input end, a second inverting input end and a second output end, wherein the second non-inverting input end is electrically coupled to the data line, and the second output end is electrically coupled to the second inverting input end and the control end of the second transistor;

a third capacitor electrically coupled between the first non-inverting input end and the data line; and a fourth capacitor electrically coupled between the second non-inverting input end and the data line.

3. The display apparatus as claimed in claim 2, further comprising:

a third operational amplifier having a third non-inverting input end, a third inverting input end and a third output end, wherein the third non-inverting input end is configured for receiving the second operating voltage, the third inverting input end is electrically coupled to the first output end through a first resistor, and the third output end is electrically coupled to the third inverting input end through a second resistor;

a fourth operational amplifier having a fourth non-inverting input end, a fourth inverting input end and a fourth output end, wherein the fourth non-inverting input end is configured for receiving the first operating voltage, the fourth inverting input end is electrically coupled to the second output end through a third resistor, and the fourth output end is electrically coupled to the fourth inverting input end through a fourth resistor;

a fifth transistor, wherein a first end of the fifth transistor is electrically coupled to the control end of the first transistor, a control end of the fifth transistor is electrically coupled to the third output end, and a second end of the fifth transistor is electrically coupled to the data line; and a sixth transistor, wherein a first end of the sixth transistor is electrically coupled to the control end of the second transistor, a control end of the sixth transistor is electrically coupled to the fourth output end, and a second end of the sixth transistor is electrically coupled to the data line.

4. The display apparatus as claimed in claim 1, wherein the first control unit comprises:

a first operational amplifier having a first non-inverting input end, a first inverting input end and a first output end, wherein the first non-inverting input end is configured for receiving the first operating voltage, the first inverting input end is electrically coupled to the data line through a third capacitor, and the first output end is electrically coupled to the first inverting input end through a first resistor;

a second operational amplifier having a second non-inverting input end, a second inverting input end and a second output end, wherein the second non-inverting input end is configured for receiving the first operating voltage, the second inverting input end is electrically coupled to the first output end through a second resistor, and the second output end is electrically coupled to the second inverting input end through a fourth capacitor and coupled to the control end of the first transistor, respectively;

a third operational amplifier having a third non-inverting input end, a third inverting input end and a third output end, wherein the third non-inverting input end is configured for receiving the second operating voltage, the third inverting input end is electrically coupled to the data line through a fifth capacitor, and the third output end is electrically coupled to the third inverting input end through a third resistor; and a fourth operational amplifier having a fourth non-inverting input end, a fourth inverting input end and a fourth output end, wherein the fourth non-inverting input end is configured for receiving the second operating voltage, the fourth inverting input end is electrically coupled to the second output end through a fourth resistor, and the fourth output end is electrically coupled to the fourth inverting input end through a sixth capacitor and coupled to the control end of the second transistor, respectively.

5. A pixel driving method, comprising:

providing a first current, by a first current compensation unit, to a plurality of pixels through a data line to compensate for a leakage current flowing out of the data line when a voltage on the data line electrically coupled to the pixels is pulled down, wherein the first current compensation unit comprises:

a first capacitor;

a first transistor, wherein a first end of the first transistor is electrically coupled to one end of the first capacitor and configured for receiving a first operating voltage, a control end of the first transistor is electrically coupled to the other end of the first capacitor, and a second end of the first transistor is electrically coupled to the data line; and a third transistor, wherein a first end of the third transistor is configured for receiving the first operating voltage, a control end of the third transistor is configured for receiving a reset signal, and a second end of the third transistor is electrically coupled to the control end of the first transistor; and sinking a second current, by a second current compensation unit, from the pixels through the data line to compensate for a leakage current flowing into the data line when the voltage on the data line is pulled up, wherein the second current compensation unit comprises:

a second capacitor;

a second transistor, wherein a first end of the second transistor is electrically coupled to one end of the second capacitor and configured for receiving a second operating voltage, a control end of the second transistor is electrically coupled to the other end of the second capacitor, and a second end of the second transistor is electrically coupled to the data line; and a fourth transistor, wherein a first end of the fourth transistor is configured for receiving the second operating voltage, a control end of the fourth transistor is configured for receiving the reset signal, and a second end of the fourth transistor is electrically coupled to the control end of the second transistor, wherein when the reset signal turns on the third transistor and the fourth transistor, the first capacitor and the second capacitor discharges through the third transistor and the fourth transistor, respectively.

6. The pixel driving method as claimed in claim 5, wherein the operation of providing the first current comprises:

controlling the first transistor between the first operating voltage and the data line to conduct to generate the first current;

clamping the voltage across the first transistor to a first voltage; and adjusting a value of the first voltage according to the voltage on the data line.

7. The pixel driving method as claimed in claim 6, wherein the operation of sinking the second current comprises:

controlling the second transistor between the second operating voltage and the data line to conduct to generate the second current;

clamping the voltage across the second transistor to a second voltage; and adjusting a value of the second voltage according to the voltage on the data line.

8. The pixel driving method as claimed in claim 5, further comprising:

providing a drive current flowing into the data line according to the voltage on the data line when a signal source provides a data current to the pixels through the data line, wherein the drive current and the data current flow in the same direction on the data line and flow to the pixels through the data line.

* * * * *